(12) United States Patent
Issaev et al.

(10) Patent No.: US 11,817,545 B2
(45) Date of Patent: *Nov. 14, 2023

(54) SECONDARY ELECTROCHEMICAL CELLS WITH SEPARATOR AND ELECTROLYTE COMBINATION

(71) Applicant: DURACELL U.S. OPERATIONS, INC., Wilmington, DE (US)

(72) Inventors: Nikolai Nikolaevich Issaev, Woodbridge, CT (US); Alexander Kaplan, Providence, RI (US); Junan Kao, Newton, MA (US); Kirakodu Seetharama Nanjundaswamy, Potomac Falls, VA (US); Michael Pozin, Brookfield, CT (US); Fan Zhang, Newtown, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,371

(22) Filed: Aug. 3, 2021

(65) Prior Publication Data

US 2021/0367262 A1 Nov. 25, 2021

Related U.S. Application Data

(63) Continuation of application No. 13/482,805, filed on May 29, 2012, now Pat. No. 11,081,721, which is a
(Continued)

(51) Int. Cl.
*H01M 10/052* (2010.01)
*H01M 10/0568* (2010.01)
(Continued)

(52) U.S. Cl.
CPC ......... *H01M 10/052* (2013.01); *H01M 4/382* (2013.01); *H01M 4/525* (2013.01);
(Continued)

(58) Field of Classification Search
None
See application file for complete search history.

(56) References Cited

U.S. PATENT DOCUMENTS

| 4,238,554 A | 12/1980 | Barrella |
| 4,482,615 A | 11/1984 | Rosansky et al. |

(Continued)

FOREIGN PATENT DOCUMENTS

| CN | 1645651 A | 7/2005 |
| CN | 1845364 A | 10/2006 |

(Continued)

OTHER PUBLICATIONS

PCT International Search Report with Written Opinion for case No. Z8411, International Application PCT/US2010/056792 dated Jan. 25, 2011; 11 pages.
(Continued)

*Primary Examiner* — Jonathan Crepeau
*Assistant Examiner* — Angela J Martin
(74) *Attorney, Agent, or Firm* — MARSHALL, GERSTEIN & BORUN LLP (57) ABSTRACT

A secondary electrochemical cell comprises an anode, a cathode including electrochemically active cathode material, a separator between the anode and the cathode, and an electrolyte. The electrolyte comprises at least one salt dissolved in at least one organic solvent. The separator in combination with the electrolyte has an area-specific resistance of less than about 2 ohm-cm$^2$.

17 Claims, 1 Drawing Sheet

Related U.S. Application Data continuation-in-part of application No. 12/624,670, filed on Nov. 24, 2009, now Pat. No. 8,349,493.

(51) Int. Cl.

| | | |
|---|---|---|
| *H01M 4/58* | (2010.01) | |
| *H01M 10/0525* | (2010.01) | |
| *H01M 10/0569* | (2010.01) | |
| *H01M 4/587* | (2010.01) | |
| *H01M 10/0567* | (2010.01) | |
| *H01M 4/525* | (2010.01) | |
| *H01M 50/446* | (2021.01) | |
| *H01M 50/417* | (2021.01) | |
| *H01M 50/426* | (2021.01) | |
| *H01M 50/491* | (2021.01) | |
| *H01M 4/38* | (2006.01) | |
| *H01M 10/42* | (2006.01) | |

(52) U.S. Cl.
CPC ......... *H01M 4/587* (2013.01); *H01M 4/5825* (2013.01); *H01M 10/0525* (2013.01); *H01M 10/0567* (2013.01); *H01M 10/0568* (2013.01); *H01M 10/0569* (2013.01); *H01M 50/417* (2021.01); *H01M 50/426* (2021.01); *H01M 50/446* (2021.01); *H01M 50/491* (2021.01); *H01M 2010/4292* (2013.01)

(56) References Cited

U.S. PATENT DOCUMENTS

| | | | |
|---|---|---|---|
| 4,654,280 | A | 3/1987 | Bailey |
| 4,808,497 | A | 2/1989 | Blomgren et al. |
| 4,952,330 | A | 8/1990 | Leger et al. |
| 5,219,683 | A | 6/1993 | Webber |
| 5,290,414 | A | 3/1994 | Marple |
| 5,458,997 | A | 10/1995 | Crespi et al. |
| 5,472,808 | A | 12/1995 | Peled et al. |
| 5,514,491 | A | 5/1996 | Webber |
| 5,691,083 | A | 11/1997 | Bolster |
| 6,171,729 | B1 | 1/2001 | Gan et al. |
| 6,200,704 | B1 | 3/2001 | Katz et al. |
| 6,218,054 | B1 | 4/2001 | Webber |
| 6,300,004 | B1 | 10/2001 | Tucholski |
| 6,627,353 | B1 | 9/2003 | Munshi |
| 6,670,073 | B2 | 12/2003 | Tucholski et al. |
| 6,720,113 | B2 | 4/2004 | Goto et al. |
| RE38,518 | E | 5/2004 | Tucholski |
| 6,730,136 | B2 | 5/2004 | Webber |
| 6,849,360 | B2 | 2/2005 | Marple |
| 7,112,389 | B1 | 9/2006 | Arora et al. |
| 7,157,185 | B2 | 1/2007 | Marple |
| 7,338,734 | B2 | 3/2008 | Chiang et al. |
| 7,722,988 | B2 | 5/2010 | Webber |
| 8,119,286 | B2 | 2/2012 | Issaev et al. |
| 8,148,013 | B2 | 4/2012 | Chiang et al. |
| 8,148,015 | B2 | 4/2012 | Pan et al. |
| 8,349,493 | B2 | 1/2013 | Issaev et al. |
| 11,081,721 | B2 | 8/2021 | Issaev et al. |
| 2003/0070283 | A1 | 4/2003 | Webber |
| 2003/0228518 | A1 | 12/2003 | Marple |
| 2004/0029007 | A1 | 2/2004 | Kusumoto et al. |
| 2005/0095508 | A1 | 5/2005 | Yamamoto |
| 2005/0112462 | A1 | 5/2005 | Marple |
| 2005/0196673 | A1 | 9/2005 | Biensan et al. |
| 2005/0233214 | A1 | 10/2005 | Marple et al. |
| 2005/0277023 | A1 | 12/2005 | Marple et al. |
| 2006/0046152 | A1 | 3/2006 | Webber |
| 2006/0046153 | A1 | 3/2006 | Webber |
| 2006/0046154 | A1 | 3/2006 | Webber et al. |
| 2007/0166617 | A1 | 7/2007 | Gozdz et al. |
| 2008/0076029 | A1 | 3/2008 | Bowden et al. |
| 2009/0148756 | A1 | 6/2009 | Specht et al. |
| 2009/0197158 | A1 | 8/2009 | Ogawa et al. |
| 2009/0208849 | A1 | 8/2009 | Pozin et al. |
| 2009/0214950 | A1 | 8/2009 | Bowden et al. |
| 2009/0217513 | A1 | 9/2009 | Xi et al. |
| 2009/0220860 | A1 | 9/2009 | Xi et al. |
| 2009/0263727 | A1 | 10/2009 | Josephs et al. |
| 2009/0297949 | A1 | 12/2009 | Berkowitz et al. |
| 2009/0297950 | A1 | 12/2009 | Zhao et al. |
| 2010/0248038 | A1 | 9/2010 | Takami et al. |
| 2011/0008233 | A1* | 1/2011 | Miyanaga ........... H01M 4/5825 423/306 |
| 2011/0027658 | A1 | 2/2011 | Kim et al. |
| 2011/0031105 | A1 | 2/2011 | Miyanaga |
| 2011/0070488 | A1 | 3/2011 | West et al. |
| 2011/0081577 | A1 | 4/2011 | Gozdz et al. |
| 2011/0111279 | A1 | 5/2011 | Smithyman et al. |
| 2011/0123875 | A1 | 5/2011 | Issaev et al. |
| 2011/0143218 | A1 | 6/2011 | Issaev et al. |
| 2011/0165462 | A1 | 7/2011 | Zhamu et al. |
| 2011/0177398 | A1 | 7/2011 | Affinito et al. |
| 2011/0217589 | A1 | 9/2011 | Kobayashi et al. |
| 2011/0250495 | A1 | 10/2011 | Webber et al. |
| 2012/0028105 | A1 | 2/2012 | Kumar et al. |
| 2012/0096708 | A1 | 4/2012 | Blasi et al. |
| 2012/0145468 | A1 | 6/2012 | Pekala et al. |
| 2013/0095358 | A1 | 4/2013 | Schubert et al. |
| 2013/0189575 | A1 | 7/2013 | Anguchamy et al. |
| 2013/0224632 | A1 | 8/2013 | Roumi |
| 2013/0309549 | A1* | 11/2013 | Luski .................. H01M 50/451 429/188 |
| 2014/0050972 | A1 | 2/2014 | Amiruddin et al. |
| 2014/0065464 | A1 | 3/2014 | Masarapu et al. |

FOREIGN PATENT DOCUMENTS

| | | |
|---|---|---|
| JP | 2006-100164 A | 4/2006 |
| JP | 2007042447 A | 2/2007 |
| JP | 2007052935 A | 3/2007 |
| WO | WO-2009/129213 A1 | 10/2009 |

OTHER PUBLICATIONS

PCT International Search Report with Written Opinion for case No. Z8412, International Application PCT/US2010/057129 dated Mar. 4, 2011; 12 pages.

\* cited by examiner

SECONDARY ELECTROCHEMICAL CELLS WITH SEPARATOR AND ELECTROLYTE COMBINATION

CROSS-REFERENCE TO RELATED APPLICATION

This application is a continuation of U.S. Ser. No. 13/482,805, filed on May 29, 2012, which is a continuation-in-part of U.S. Ser. No. 12/624,670, filed on Nov. 24, 2009, both of which are hereby incorporated by reference in their entirety.

FIELD OF THE INVENTION

The invention relates to a secondary electrochemical cell.

BACKGROUND OF THE INVENTION

The development of secondary battery systems capable of high charge and discharge rates requires the compatibility of an electrolyte possessing desirable electrochemical and physical properties with anode and cathode materials.

While the theoretical energy, i.e., the electrical energy potentially available from a selected anode-cathode couple, of a battery system is relatively easy to calculate, there is a need to choose an electrolyte for such couple that permits the actual energy produced by an assembled cell or battery to approach the theoretical energy. In addition, certain battery applications require high power capabilities at both high rates of charge and discharge, and also across varying temperature. The problem usually encountered is that it is practically impossible to predict in advance how well, if at all, an electrolyte will function with, a selected couple. A battery must be considered as a unit having four main components: a cathode, an anode, a separator, and an electrolyte. It is to be understood that the parts of one battery may not predictably interchange with parts of another battery to produce an efficient and workable battery. Furthermore it has been realized that the selection of the separator in conjunction with the electrolyte may play an important part in the performance characteristics of a battery.

A significant portion of contemporary portable electronic devices are powered, by lithium-ion secondary batteries. There exists a need to provide an electrolyte solution and separator combination for use in a secondary battery to provide lower overall cell or battery impedance to substantially increase battery performance characteristics, such as charge rate and discharge rate, cycle life, storage, and safety.

SUMMARY OF THE INVENTION

The invention is directed to a secondary electrochemical cell comprising an anode, a cathode, a separator between the anode and cathode, and an electrolyte. The cathode comprises electrochemically active cathode material. The electrolyte comprises at least one salt dissolved in at least one organic solvent. The separator in combination with the electrolyte has an area-specific resistance of less than about 2 ohm-cm$^2$.

BRIEF DESCRIPTION OF THE DRAWING

While the specification concludes with claims particularly pointing out and distinctly claiming the subject matter, which is regarded as forming the present invention, it is believed that the invention will be better understood from the following description taken in conjunction with the accompanying drawing.

DETAILED DESCRIPTION OF THE INVENTION

Figure 1:
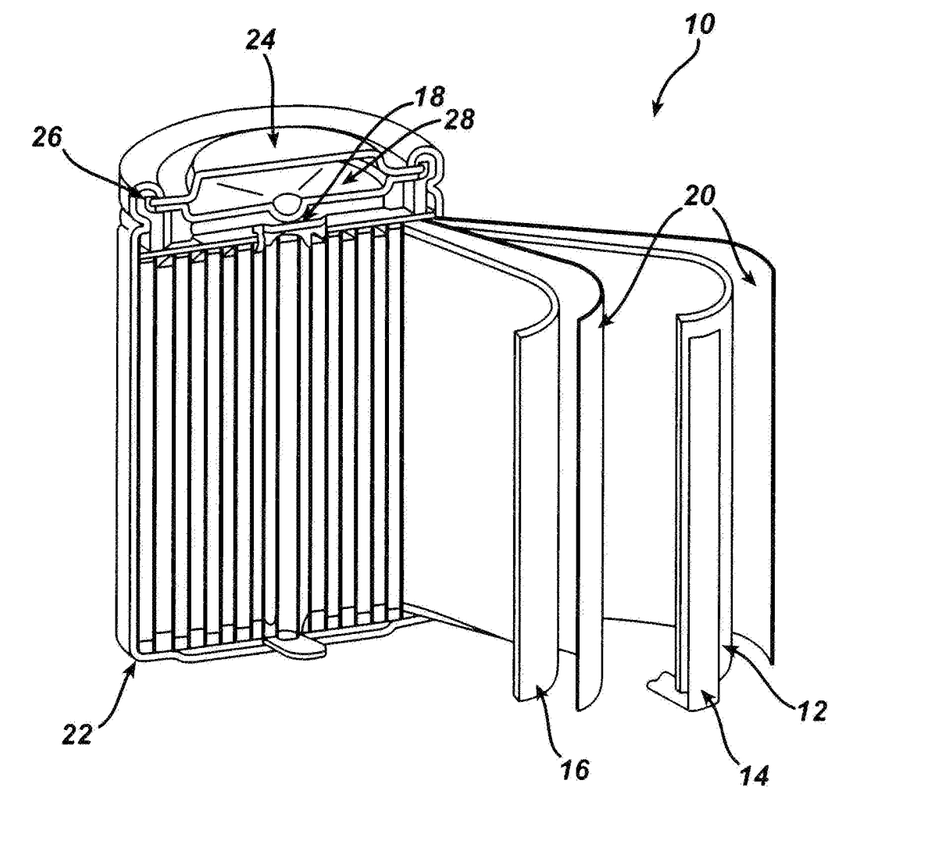
FIG. 1 is a schematic perspective view of an embodiment of a secondary electrochemical cell of the present invention.

A secondary electrochemical cell 10 includes an anode 12 in electrical contact with a negative lead 14, a cathode 16 in electrical contact with a positive lead 18, a separator 20, and an electrolyte (not shown). Anode 12 and cathode 16, with separator 20 disposed therebetween, may be rolled into an assembly that is customarily referred to as a jelly-roll assembly. Anode 12, cathode 16, separator 20, and the electrolyte are contained within a housing 22. The cell 10 further includes a cap 24 and an annular insulating gasket 26. The cell 10 may include a safety vent 28.

The anode 12 may comprise at least one electrochemically active anode material. The anode material may be blended with at least one conductive additive and at least one binder material. The anode blend may be coated onto an electrically conductive support that may perform as an anode current collector.

The electrochemically active anode material may be selected from metallic lithium, lithium alloys, composite oxides of lithium, and any mixture thereof. The electrochemically active anode material may comprise silicon (Si), silicon alloys, tin (Sn), tin (Sn) alloys, lithium titanates (e.g., Li$_4$Ti$_5$O$_{12}$), and any mixture thereof. The electrochemically active anode material may also be selected from carbonaceous materials capable of inserting lithium into their structures. The carbonaceous material may be non-graphitic or graphitic. The carbonaceous material may be natural or synthetic carbon that is graphitized and may also be of a small particle size. Graphitic materials, such as natural graphite, spheroidal natural graphite, mesocarbon microbead, coke, mesophase carbon fiber, and any mixture thereof, may be generally preferred although non-graphitic carbon materials may be employed. The carbonaceous material may be graphite, fullerene, graphene, carbon nanotube, single-walled carbon nanotube (SWCNT), multi-wall carbon nanotube (MWCNT), vapor-phase grown carbon fiber (VGCF), and any mixture thereof. Carbonaceous anodes that include both silicon and lithium may also be utilized as anodic materials. Other electrochemically active anode materials may include lithium-alloying materials, intermetallics, silicon, and silicon-based compounds such as silicon dioxide.

The conductive additive may be selected from graphite, carbon black, acetylene black, vapor-phase grown carbon fiber (VGCF), carbon nanotube, fullerenic carbon nanotube, vitreous carbon, carbon fiber, graphene, and any mixture thereof. Conductive additives may be present in a range of about 0%-10% by weight of the total solid composition of the anode.

The cathode 16 may comprise an electrochemically active cathode material. The cathode material may be blended with at least one conductor material and at least one binder material. The cathode blend may then be coated onto an electrically conductive support that may perform as a cathode current collector.

The electrochemically active cathode material may be selected from lithium-based compounds, sodium-based compounds, and any mixture thereof. The lithium-based and sodium-based compound may include one or more compounds selected from oxygen, phosphorous, sulphur, nitrogen, nickel, cobalt, manganese, vanadium, silicon, carbon, aluminum, niobium, zirconium and iron. Typical cathode materials may include lithium-metal oxides. Examples of lithium-metal oxides may include $LiCoO_2$, $LiNi_xMn_{2-x}O_4$, $Li(Ni_xCo_yAl_z)O_2$, $Li(Ni_xMn_yCo_z)O_2$, $aLi_2MnO_3 \cdot (1-a)Li(Ni_xMn_yCo_z)O_2$, and any mixture thereof wherein $0<a<1$, $0 \leq x \leq 1$, $0 \leq y \leq 1$, and $0 \leq z \leq 1$. Other suitable cathode materials may include vanadium oxides.

Cathode 16 may comprise lithium-transition metal-phosphate, sodium-transition metal-phosphate, and any mixture thereof as the cathode active material. The lithium-transition metal-phosphate and sodium-transition metal-phosphate compound may be optionally doped with a metal, metalloid, or halogen. The lithium-transition metal-phosphate and sodium-transition metal-phosphate may be an olivine structure compound, such as $LiMPO_4$ and $NaMPO_4$ here M is one or more of vanadium (V), chromium (Cr), manganese (Mn), iron (Fe), cobalt (Co), tin (Sn), niobium (Nb), molybdenum (Mo), zirconium (Zr), zinc (Zn), nickel (Ni), and any mixture thereof. An example of lithium-transition metal-phosphate having an olivine structure may be $LiFePO_4$. An example of sodium-transition metal-phosphate having an olivine structure may be $NaFePO_4$. The cathode active material may be optionally doped at the Li, M or O-sites. Deficiencies at the Li-site may be compensated by the addition of a metal or metalloid, and deficiencies at the O-site may be compensated by the addition of a halogen. In some embodiments, the cathode active material is a thermally stable, doped lithium transition metal phosphate having an olivine structure and having the formula $(Li_{1-x}Z_x)MPO_4$, where M is one or more of V, Cr, Mn, Fe, Co, and Ni, and Z is a non-alkali metal dopant such as one or more of Sn, Zr, Nb, aluminum (Al), or magnesium (Mg), and x ranges from 0.005 to 0.05.

The conductor material may be selected from carbon compounds. The carbon compounds may be selected from, graphite, fullerene, graphene, and any mixture thereof. The conductor material may have a nano-structure. The nanostructure material may, for example, be a carbon nanotube structure. Carbon nanotube structures may include singlewalled carbon nanotube (SWCNT), multi-wall carbon nanotube (MWCNT), vapor-phase grown carbon fiber (VGCF), and any mixture thereof. The diameters of the various carbon nanotube structures may between 0.4-2 nm for SWCNT; between 4 to 100 nm for MWCNT; and greater than 100 nm for VGCF.

A dispersant may be used when the conductor material includes nanostructures. The dispersant may aid, for example, in the dispersing of carbon nanotubes in a solvent prior to blending the carbon nanotube mixture with the cathode active material and binder. The dispersant may help insure that the carbon nanotubes are more effectively dispersed, throughout the cathode active material/conductor/binder blend and may lead to a more efficient and higher-performing cathode. The dispersant may be a polar polymeric compound, a surfactant, or a high viscosity liquid such as mineral oil or wax. Exemplary dispersants may include polyvinylpyrrolidone (PVP), polystyrene sulfonate (PSS), polyphenylacetylene (PAA), poly-meta-phenylenevinylene (PmPV), polypyrrole (PPy) poly p-phenylene benzobisoxazole (PBO), natural polymers, amphiphilic materials in aqueous solutions, anionic aliphatic surfactant, sodium dodecyl sulfate (SDS), cyclic lipopeptide bio surfactant, surfactin, water-soluble polymers, polyvinyl alcohol (PVA), sodium dodecyl sulfate (SDS), polyoxyethylene surfactant, polyvinylidene fluoride (PVDF), carboxyl methyl cellulose (CMC), hydroxyl ethyl cellulose (HEC), polyacrylic acid (PAA), polyvinyl chloride (PVC) and combinations thereof.

The anode and cathode current collector may be made of metal or other electrically-conductive material, such as nickel, copper, aluminum, titanium, and combinations thereof, as well as graphitized clothes, such as graphite foil. The current collector may be a thin, flat, sheet material, such as a foil. The current collector may have a thickness from about 5 μm to about 300 μm. The current collector thickness may be from about 8 μm to about 20 μm for metal foils and may be from about 100 μm to about 200 μm for graphite foils.

Any suitable binder, e.g., those utilized in non-aqueous electrolyte cells, may be used in anode 12 or cathode 16. Exemplary binder materials include polyvinylidene fluoride (PVDF)-based polymers, such as poly(vinylidene fluoride) (PVDF), and its co- and terpolymers with hexafluoroethylene, hexafluoropropylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), styrene-ethylene-butylene-styrene (SEBS), polyimides, polyurethanes, and ethylene-vinyl acetate copolymers. Polymeric binders may include polyethylene, polypropylene, polyamide, polyurethane, polyvinyl chloride, polyvinylidene fluoride, thermoplastic polyester resin and combinations thereof.

The electrolyte comprises at least one salt dissolved in at least one organic solvent. The salt may comprise lithium. The salt may be at least one compound selected from the group consisting of lithium perchlorate ($LiClO_4$), lithium hexaflurophosphate ($LiPF_6$), lithium tetrafluorooxalatophosphate ($LiPF_4(C_2O_4)$), lithium tetrafluoroborate ($LiBF_4$), lithium trifluorsulfonate ($LiSO_3CF_3$), lithium trifluorsulfonimide ($LiN(SO_2CF_3)_2$), $LiN(SO_2CF_2CF_3)_2$ (LiBETi), lithium bis(oxalato)borate (LiBOB), lithium hexafluoroarsenate ($LiAsF_6$), lithium fluorsulfoneimide (LiFSI), and any mixture thereof. The salt may comprise salts containing the sodium cation, such as sodium perchlorate ($NaClO_4$), sodium trifluorsulfonimide (NaTFSI), sodium trifluorsulfonate (NaTFS), and any mixture thereof. The salt may be at a concentration within the electrolyte from about 0.5 M to about 1.8 M, or more specifically about 1.3 M.

The organic solvent may be at a concentration from about 0.5, 1.0, 5.0 or 10 to about 30, 55, 75 or 95 weight percent of the electrolyte solution. The organic solvent may be at least one selected from the group consisting of ethylene carbonate (EC), propylene carbonate (PC), butylene carbonate (BC), dimethyl carbonate (DMC), ethyl methyl dicarbonate (EMC), diethyl carbonate (DEC), and their chlorinated or fluorinated derivatives as well as dipropyl carbonate, methyl propyl carbonate, ethyl propyl carbonate, dibutyl carbonate, butylmethyl carbonate, butylethyl carbonate, butylpropyl carbonate, and any mixture thereof.

The electrolyte may also comprise an electrolyte additive. The electrolyte additive may comprise at least one of propane sultone (PS), vinylene carbonate (VC), succinonitrile (SN), cyclohexylbenzene (CHB), tetra ethyl orthosilicate (TEOS), lithium bis(oxalato)borate (LiBOB), tetramethoxy titanium (TMTi), dimethyl acetamide (DMAc), lithium perchlorate ($LiClO_4$), propargyl methane sulfonate (PMS), and any mixture thereof. The electrolyte additive may be at a concentration from about 0.05, 1.5, or 2 weight percent to about 4, 4.5, or 5 weight percent of the electrolyte solution.

It has been found that in addition to the electrolyte a low resistance separator may facilitate optimal high charge rate capability and high discharge rate capability, as well as cycle life, of an assembled secondary cell or battery. A desired separator material for use in high charge rate and high discharge rate secondary cells comprises extruded or cast microporous films (membranes). The separator may comprise polypropylene, polyethylene, polyvinylidene, poly(vinylidene fluoride), and any combination thereof. The separator may also include inorganic filler material, such as $Al_2O_3$, $SiO_2$, and $TiO_2$. Separators that include such inorganic filler may have application, for example, within automotive applications of batteries. The separator may have a thickness from about 8, 10, or 12 to about 24, 26, 28, or 30 micrometers (microns). The microporous membrane separator may have a pore size range from about 0.005, 0.01, or 0.1 microns to about 4, 4.5, or 5 microns and more specifically from about 0.005 microns to about 0.3 microns. The microporous membrane separator may have porosity from about 30 percent to about 70 percent, or from about 35 percent to about 65 percent. One skilled in the art will understand that porosity (P) is a measure of void spaces in a material and can be presented as a fraction (between 0 and 1) of the volume of voids over the total volume of the material, or as a percentage (between 0% and 100%), e.g., $P=V_{void}/V_{total} \times 100\%$, where $V_{void}$ is the cumulative volume of void spaces (i.e., the volume not occupied by solids) in the material; and $V_{total}$ is the total or bulk volume of the material (including both solids and voids: $V_{total}=V_{solids}+V_{void}$, where $V_{solids}$ is the volume of all solid components of the material).

The pore size of the separator may be above a minimum value which enables the non-hindered transport of a solvated ion. A solvated lithium ion may be on the order of 10 Angstroms or 0.001 micron. Since it may be common for organic electrolyte systems to form ion pairs and for at least a monolayer of an electrolyte solvent to line the pore walls of the separator, a minimum pore diameter of 0.005 micron enables the non-impeded passage of an ion through a pore. As the pore size increases, however, nonporous areas also need to increase in order to provide mechanical strength. Increasing these nonporous areas may lead to a blockage of a substantial portion of the separator, which will impede ion migration. As a result, a relatively large number of moderately sized pores may be preferred to a relatively few very large pores.

Another way of viewing this effect is that the distance between pores may be as important as the pore diameter. Typically, in separators of submicron size, the distance between pores should also be less than a micron. In addition, it is also a function of the separator to form a physical barrier to the passage of electrode particles through the separator that could result in an electrical short between the anode and cathode. Such electrode particles can be as small as a few microns, thus also limiting the desired pore diameter. Consequently the pore size may preferably be in the submicron range or the pores should be sufficiently tortuous to provide a physical barrier to the passage of electrode particles through the separator. A porosity of 35% may typically be utilized to provide moderate ion transport. Porosities greater than 70% typically may result in insufficient tensile strength for processing into an electrochemical cell and the need for thicker than desired separators.

Methods for determining pore size of a porous material include liquid displacement and gaseous flow measurements, such as porometry. In porometry, an inert gas is made to flow through the sample. The sample is contained within a fixture that prevents gas flow to occur around the sample. The gas pressure (flow rate) is increased in small increments. The differential pressures and the corresponding gas flow rates through the dry samples are measured. The sample is then wetted. The gas is again passed through the sample with incremental adjustments to the gas pressure (flow rate). The differential pressures and corresponding gas flow rates through the wet samples are similarly measured as with the dry sample. Pore structure characteristics are computed from these values. These measurements may be performed using commercial instruments that conform to ASTM standard methods including D6767, E128, F316, and similar methods, such as the Porometer 3 Gzh supplied by Quantachrome Corporation of Boyton Beach, Fla.

Area-specific resistance is a measured property of the combined separator and electrolyte that is influenced by properties such as pore size, number of pores, porosity, tortuosity and wettability. The area-specific resistance value may be the best parameter which can be correlated to electrochemical cell rate capability. In the case of lithium secondary cells or batteries having organic electrolytes and solid cathodes the most preferred area-specific resistance (ASR) value for high rate charge capability and high discharge rate capability should be less than about 2 ohm-cm². The ASR may be between about 1.0 ohm-cm² and about 1.9 ohm-cm². Specifically, the ASR may be between about 1.05 ohm-cm² to about 1.7 ohm-cm².

Tortuosity in its simplest definition is the ratio of actual pore length, i.e., how far an ion has to travel to pass through a separator, to the separator thickness. This definition, however, assumes that mass transport through a pore is affected only by distance and does not take other hindrances to mass transport into account. Such hindrances include: pore bottle necks or pore restrictions, noninterconnected pores or dead ends, inhibited ion flow as ions collide with pore side walls at channel bends. Since no model accurately describes the tortuosity of a separator and since the tortuosity of each separator is different, the best indication of separator tortuosity is that estimated from the measured resistance value in electrolyte. The most common method of determining the effective tortuosity of a separator is based on the separator porosity and the ratio of specific conductivity of the separator to that of the electrolyte. Thus, $$[(R_{separator})/(R_{solution})]=[(\text{Tortuosity}^2)/(\text{Porosity})]$$

where $R_{separator}$ is the area-specific resistance in ohms-cm² of the separator, $R_{solution}$ is the area-specific resistance in ohms-cm² of the electrolyte, and porosity in volume fraction. Although this equation assumes all pores have identical tortuosities, it is accurate for defining the separator of this invention. It has been found that the best high-rate separators exhibit tortuosities of less than 2.0 and preferably less than 1.7. A study of commercial separators suggest that high tortuosity may not be so much a result of actual tortuous paths but rather a result of regions of pore blockage. That is, many separators display layered regions of high and low porosity. If the regions of low porosity limit ion transport, the result is a higher resistance value which is reflected in a higher tortuosity value. F. L Tye described in the Journal of Power Sources Vol. 9 (1983), 89-100, a theoretical calculation of the contribution that pores of varying tortuosities have on overall separator conductivity. Based on this treatment, if a separator contained 50% of its pores at a tortuosity of 1.5 and 50% of its pores at a tortuosity of 4, 88% of the conductivity is a result of the pores at a tortuosity of 1.5. This theoretical treatment of pore structure and separator conductivity supports the observations of measured separator resistances. In reality, however, a measured resistance and estimated tortuosity do not provide any insight as to whether all the pores have equal tortuosity or if only a small portion of the current is being carried through a few pores of low tortuosity. Different cell performances would be expected based on the distribution of pore tortuosities.

Another category of separators produced from microfibers, such as by melt-blown nonwoven film technology, may also be useful. Such films typically possess pores of several microns in diameter but displaying less tortuous paths. In addition, there is another category of separators that are formed in situ to the battery.

In one embodiment, the separator comprises a material that is wettable or wetted by the electrolyte. A material is said to be wetted by a liquid when the contact angle between the liquid and the surface is less than 900 or when the liquid tends to spread spontaneously across the surface; both conditions normally coexist.

The jelly-roll assembly comprising anode 12 and cathode 16 with separator 20 therebetween may be prepared by spirally winding flat electrodes with separator material. Anode 12 may comprise an anode active material, such as carbon, blended with a binder and coated onto metallic substrate, such as a foil, sheet, grid, or screen. Cathode 16 may comprise a cathode active material, such as lithium iron phosphate, blended with carbon material and binder, and coated onto metallic substrate, such as a foil, sheet, grid, or screen. Separator 20 comprises electrolyte permeable material, such as microporous polypropylene or polyethylene.

To fabricate a jelly-roll assembly, separator 20 may be inserted on each side of the anode 12. The first (top) separator sheet can be designated as the outer separator sheet and the second sheet can be designated as the inner separator sheet. The cathode 16 may then placed against the inner separator sheet to form the flat electrode assembly. The anode 12 and cathode 16 may be aligned so that the cathode geometric area has an opposing anode geometric area with separator therebetween. In lithium-ion secondary batteries, the anode geometric area may generally be equal to or greater than the cathode geometric area.

The flat electrode assembly may be spirally wound to form an electrode spiral, or jelly-roll, assembly. The winding can be accomplished using a mandrel to grip an extended separator edge of the flat electrode assembly and then spirally winding the flat electrode assembly to form the jelly-roll assembly. The winding may occur either clockwise or counter-clockwise depending on the electrode desired by design to be at the outermost radius of the jelly-roll assembly. The finished jelly-roll assembly may have either an anode outer-wrap (the anode located towards its outermost radius) or a cathode outer-wrap (the cathode located towards its outermost radius). Lithium-ion secondary batteries may use a jelly-roll assembly that follows an anode outer-wrap design. In the alternative, a jelly-roll assembly that follows a cathode outer-wrap design may be used in a lithium-ion secondary battery.

The anode and cathode each have a total theoretical capacity resulting from the electrochemically active materials, i.e., materials that may contribute to the charge and discharge performance of the assembled battery, within the electrode structures. The total theoretical capacity of an electrode may be determined by multiplying the loading of active electrode material(s) in the electrode, in grams per $cm^2$, by the gravimetric specific capacity of the active electrode material(s), in amp-hours per gram. The gravimetric specific capacity value of the active electrode material may be theoretical or experimentally determined. For example, the specific theoretical capacity of lithium iron phosphate may be 0.170 Ah/g. A cathode may have a loading of 0.0058 $g/cm^2$ of 91% lithium iron phosphate as the active material. The resulting total theoretical capacity of the exemplary cathode would be 0.000897 $mAh/cm^2$. Similarly, the specific theoretical capacity of carbon may be 0.372 Ah/g. An anode may have a loading of 0.0029 $g/cm^2$ of 94% carbon as the active material. The resulting total theoretical capacity of the exemplary anode would be 0.00101 $Ah/cm^2$.

A useful expression relating to the overall design of a battery is the anode-to-cathode (A/C) ratio. The A/C ratio enables persons skilled in the art to readily determine the amount of capacity of active electrode material(s) within a battery's anode in relation to the battery's cathode for a particular battery design. The skilled artisan may use an A/C ratio that has a value, or sometimes termed "balance," that suits the overall performance of a battery design and satisfies relevant safety concerns. For example, the artisan designing a lithium-ion secondary battery may generally chose an A/C ratio of greater than about 1.0 to aid in the prevention of safety concerns. An excess of anode may be used to prevent lithium from plating on the anode electrode surface. The capacity, cycle life, and general safety of the battery will be compromised if plating should occur. The battery designer must balance these considerations, as well as manufacturing tolerances, against the desire to account for losses attributed to lithium intercalation within the anode when designing a lithium-ion secondary battery.

The A/C ratio may be expressed in relation to the total anode and cathode active material(s) within a battery design. Such an expression may be referred to as the total A/C ratio or total input ratio. To determine the total A/C ratio, the total theoretical capacity of anode active material(s) included within the cell may be divided by the total theoretical capacity of cathode active material(s) included within the cell. For the exemplary electrode capacities provided above, the total A/C ratio would be 1.13 (0.00101 $mAh/cm^2$/ 0.000897 $mAh/cm^2$).

The total A/C ratio may be adjusted, or balanced, in accordance with the desired charge or discharge and safety characteristics of the assembled battery. Generally, the lithium-ion secondary battery may be balanced to have a total A/C ratio of greater than about 1.0, regardless of cell size, e.g., AA or AAA cylindrical size or smaller or larger sizes. Preferably, the lithium-ion secondary battery may be balanced so that the total A/C ratio may be between about 1.0 and about 1.05, and about 1.35 and about 1.5, regardless of cell size.

The electrode assembly may take forms other than a jelly-roll. For example, an electrode assembly comprising an anode, a cathode, and at least one separator therebetween may be stacked upon one or more additional electrode assemblies. A stacked electrode assembly may find application within a button cell design that may, for example, be used in hearing aids, watches, or other devices with cavities capable of receiving button cells or batteries. In addition, an electrode assembly comprising an anode, a cathode, and at least one separator therebetween may be folded. The folded electrode assembly may find application within a prismatic cell design that may, for example, be used in cameras, audio devices, or other devices with cavities capable of receiving prismatic cells or batteries. The prismatic cell design may also be employed in applications that utilize an embedded battery. All of these cells, regardless of their embodiments, are within the scope of this application.

Secondary cells or batteries are those that are designed to be capable of multiple use cycles. A use cycle can be described as a charging event by an external power source of the battery (e.g., charge), followed by the retention of the energy within the battery for a period of time (e.g., retention), and subsequent delivery of the stored energy in a device (e.g., discharge). The batteries may be charged or discharged at various rates. The charge and discharge rates may be expressed in terms of C-rates. The C-rate is the theoretical amount of current, in amperes (A), that a cell or battery can continuously deliver from a fully charged state (100% SOC) to the fully discharged state (0% SOC) in 1 hour. For example, small size lithium-ion batteries used in the majority of portable applications, such as laptop computers, tablets, Smart phones, cell phones, digital cameras, video camcorders, and video games, are charged and discharged with low C-rates ranging from 0.1C to about 2C. In recent years, lithium-ion batteries have been utilized in portable applications which require high rates of discharge, for example 10C and above, such as power tools, high intensity flashlights, RC toys, and electric bikes.

The A/C ratio may have a dependence on the charge and discharge rates. Lithium metal plating may occur on the anode at higher rates of charge. Cell designers may employ an A/C ratio that is significantly higher for cells designed for high charge rate capability in relation to cells that are designed for low charge rate capability to help reduce or prevent lithium metal plating. The higher relative anode loading may lead to a higher real surface area. The current density may be reduced and lithium metal plating may be less likely to occur. The ASR of the present invention enables a cell design that is high rate capable while at the same time has a relatively lower A/C ratio. This may help reduce irreversible losses associated with the design and may increase overall delivered cell capacity. This combination may have a pronounced benefit especially under low temperature conditions.

In general, lithium-ion batteries exhibit poor performance at low temperatures of about 0° C. and below. For example, lithium-ion batteries may exhibit about 30% to 50% reduction in capacity retention at a temperature of about −20° C. as compared to similar batteries at room temperature. In many applications, charging of lithium-ion batteries at temperatures lower than 0° C. is avoided due to possible safety risk associated with lithium plating. Low temperature performance of lithium-ion batteries may become an important characteristic as lithium-ion batteries are finding application within transportation and power grid applications. Batteries that are designed according to the present invention may exhibit improved performance at temperatures as low as −40° C.

Experimental Testing

Resistivity Cell Measurements

Resistance measurements are conducted in a resistivity cell at room temperature, e.g., about 21° C. The resistivity cell consists of two stainless steel electrodes encased in Teflon®. The lower electrode is constructed such that a small reservoir of electrolyte may be maintained in the cell. The top electrode assembly is removable and is aligned to the bottom assembly via two metal pins. The top electrode assembly is spring loaded so that that force may be applied (approximately 4 to 5 lbs.) to the top of a material sample being analyzed. The lower electrode assembly is screwed to a fixture base and electrical leads are attached to each electrode. The leads are then attached to the leads of an impedance analyzer, such as a Solartron Impedance Analyzer, that is used to complete impedance sweeps to determine resistances of the cell or sample materials.

The background resistance of the resistivity cell is determined by running an impedance sweep on the fixture filled with electrolyte when its electrodes are shorted. The sweep starts at 100,000 kHz and finishes at 100 Hz using a 10 mV amplitude, using the software program ZPlot by Scribner Instruments to control the instrumentation. The resistance of the fixture ($R_{CELL}$) may have typical values between about 10 and 150 mΩ depending upon the condition of the stainless steel electrodes. Several sweeps may be completed to ensure the value obtained is relatively constant.

The resistance of the separator and electrolyte combination is determined by running an impedance sweep on a separator sample. The fixture includes a center disk upon which the separator sample may be placed. Electrolyte is placed within the cavity of the resistivity cell to a level that ensures the separator sample is well-wetted on both sides. The same impedance sweep as described above is run. Again, several sweeps may be completed to ensure the value obtained is relatively consistent. The data obtained from the sweeps is plotted on a Nyquist plot. The ohmic resistance ($R_{REAL}$) of the separator and electrolyte combination is determined at the Z"=0 point on the Nyquist plot. However, this value includes the resistance of the resistivity cell. By subtracting the resistance value of the resistivity cell ($R_{CELL}$) from the resistance determined for the separator and electrolyte combination sample that includes resistivity cell impedance ($R_{REAL}$), one can calculate the adjusted resistance value for the separator and electrolyte combination [$R_{REAL}(ADJ)$].

The area-specific resistance (ASR) of the separator/electrolyte combination is determined by multiplying the geometrical surface area of the resistivity cell's working electrode by the adjusted separator-electrolyte combination's resistance value. The working electrode surface area of resistivity cell used in these experiments is 3.83 cm$^2$. The units of ASR are Ω·cm$^2$.

The combinations of two separators with two different electrolytes are screened for inclusion within assembled cells for discharge testing.

Separator 1—ExxonMobil E16MMS, a monolayer membrane with a thickness of 16 μm and a porosity of 35%.

Separator 2—ExxonMobil E20MMS, a monolayer membrane with a thickness of 20 μm and a porosity of 36%.

Electrolyte A—A mixture of 16.04% by weight LiPF$_6$, 31.78% by weight EC, 25.09% by weight EMC, 25.09% by weight DEC, and 2.00% by weight VC.

Electrolyte B—A mixture of 11.80% by weight LiPF$_6$, 44.10% by weight EC, and 44.10% by weight DMC.

The impedance of the resistivity cell, at room temperature, is first determined with each specific electrolyte as described above. The impedance of the separator/electrolyte combination, at room temperature, is then determined with each specific electrolyte. The adjusted separator/electrolyte combination resistance is then determined and used in the calculation of the ASR. The results are included within Table 1. The separator/electrolyte combinations that have the lowest ASR values may provide lower overall cell impedance and potentially improved high rate charge and discharge.

TABLE 1

Area-specific resistance (ASR) for separator/electrolyte combinations.

| SEPARATOR | ELECTROLYTE | ASR (Ω · cm$^2$) |
|---|---|---|
| 1 | A | 2.46 |

TABLE 1-continued

Area-specific resistance (ASR) for separator/electrolyte combinations.

| SEPARATOR | ELECTROLYTE | ASR ($\Omega \cdot cm^2$) |
|---|---|---|
| 2 | A | 3.17 |
| 1 | B | 1.66 |
| 2 | B | 2.09 |

Impedance, Charge/Discharge, and Cycle Life Testing of Assembled AAA LFP Batteries An exemplary battery is assembled to evaluate the effects of the present invention on cell impedance, charge/discharge performance, and cycle life characteristics. The anode of the battery is a blend of about 95 weight percent synthetic graphite with the remaining about 5 weight percent including VGCF, PVDF binder, and oxalic acid. The anode blend is symmetrically coated onto both major faces of a current collector comprising copper foil. The cathode of the battery is a blend of about 91 weight percent lithium iron phosphate with the remaining about 9 weight percent including VGCF, carbon, and PVDF binder. The cathode blend is symmetrically coated onto both major surfaces of a carbon-coated current collector comprising copper. A separator is interposed between the anode and cathode to fabricate a jelly-roll assembly. The jelly-roll assembly is inserted in a housing that is cylindrical in shape with an outer diameter of approximately 10.5 mm and an overall height of approximately 44 mm. These dimensions correspond to the 10440 lithium-ion cell designation and are similar to the R03 designations from the International Electrotechnical Commission (IEC), e.g., LR03, FR03, and HR03. These dimensions represent what is commonly referred to as the AAA battery. Electrolyte is then added into the housing that is then sealed to finish off the battery assembly process. The electrolyte, separator, and anode-to-cathode ratio of the battery are adjusted according to Table 2.

Impedance testing follows what may be referred to as the 1 kHz Impedance Test. The 1 kHz Impedance Test is accomplished by connecting a battery to an auto-balancing, bridge-type impedance measurement instrument, such as 4333B milliohmmeter from Agilent. The battery is directly connected to the meter in a four-terminal configuration. The meter automatically measures real (resistance) and imaginary (reactance) components of the impedance vector. The real component (resistance) of the impedance vector are displayed and recorded by the meter. The resistance of the battery is reported in ohms ($\Omega$).

Performance testing includes discharge performance testing that may be referred to as the 1C Capacity Test. The 1C Capacity Test protocol includes applying a constant current/constant voltage charge followed by a constant discharge current to the battery to specified cutoff voltages. The AAA LFP battery is first charged at a 1C rate until a specified cutoff charge voltage of 3.6 V is reached. The battery remains on charge until the charge current reaches a level of C/50. The battery then rests for a period of 10 minutes prior to being discharged. The battery is discharged at a 1C rate until reaching a cutoff discharge voltage of 2.0 V. The capacity that is measured during the 1C discharge is the 1C capacity of the battery.

Performance testing also includes discharge performance testing that may be referred to as the 12C Capacity Test. The 12C Capacity Test protocol consists of applying a constant current/constant voltage charge followed by a constant discharge current to the battery to specified cutoff voltages. The AAA LFP battery is first charged at a 12C rate until a specified cutoff charge voltage of 3.9 V is reached. The battery remains on charge until the charge current reaches a level of C/10. The battery then rests for a period of 10 minutes prior to being discharged. The battery is discharged at a 1C rate until reaching a cutoff discharge voltage of 2.0 V. The capacity that is measured during the 1C discharge is the 12C capacity of the battery.

Capacity retention is a measure the battery capacity delivered under the 12C capacity test as compared to the battery capacity delivered under the 1C capacity test. Capacity retention is calculated according to the following formula:

Capacity Retention (%)=[(12C Capacity)/(1C Capacity Test)]·100

Impedance and Performance Testing

A size AAA battery is assembled that includes the combination of Separator 1 and Electrolyte B with an ASR of 1.66 $\Omega \cdot cm^2$ and an interfacial A/C ratio of 1.13. After a formation cycle and room-temperature storage, impedance and performance tests are completed on the battery at room temperature, e.g., at about 21° C.

The battery exhibits an average 1 kHz impedance of about 28.5 m$\Omega$. The battery exhibits an average 1C capacity of about 162 mAh, and an average 12C capacity of about 158 mAh. The battery exhibits 12C capacity retention of about 97.5%.

The battery exhibits 1C and 12C capacity improvements of about 8% and about 6%, respectively, and an impedance reduction of about 14% versus a comparative battery that includes a separator/electrolyte combination that has an ASR of about 2.09 $\Omega \cdot cm^2$ and an interfacial A/C ratio of 1.13 having a 12C capacity retention of about 98.0%.

A size AAA battery is assembled that includes the combination of Separator 1 and Electrolyte B with an ASR of 1.66 $\Omega \cdot cm^2$ and an interfacial A/C ratio of 1.32. After a formation cycle and room temperature storage, impedance and performance tests are performed on the battery.

The battery exhibits an average 1 kHz impedance of about 29.5 m$\Omega$, an average 1C capacity of about 156 mAh, and an average 12C capacity of about 152 mAh. The battery exhibits 12C capacity retention of about 97.4%.

The battery exhibits 1C and 12C capacity improvements of about 8% and about 8% respectively and an impedance reduction of about 10% versus a comparative battery that includes a separator/electrolyte combination that has an ASR of about 2.09 $\Omega \cdot cm^2$ and an interfacial A/C ratio of 1.32 with 12C capacity retention of about 97.2%.

TABLE 2

Performance Test results, at room temperature, for selected separator/electrolyte and Total A/C ratio combinations.

| Separator | Electrolyte | Total A/C Ratio | 1 kHz Impedance (m$\Omega$) | 1C Capacity (mAh) | 12C Capacity (mAh) | 12C Capacity Retention (%) |
|---|---|---|---|---|---|---|
| 1 | B | 1.13 | 28.5 | 162 | 158 | 97.5 |
| 2 | B | 1.13 | 33.3 | 150 | 147 | 98.0 |
| 1 | B | 1.32 | 29.5 | 156 | 152 | 97.4 |
| 2 | B | 1.32 | 32.7 | 144 | 140 | 97.2 |

Impedance, Charge/Discharge, and Cycle Life Testing of Assembled LFP/NCA 2032 Coin Cell An exemplary cell is assembled to evaluate the effects of the present invention on cell impedance, charge/discharge performance, and cycle life characteristics. The anode of the cell is a blend of graphite, carbon nanotubes, PVDF binder, and oxalic acid. The components are in weight percent ratios of about 94%:1%:4.9%:0.1% respectively. The cathode of the cell is a blend of a hybrid cathode active material (a mixture of about 75 weight percent Li(Ni$_{0.80}$Co$_{0.15}$Al$_{0.05}$)O$_2$ and about 25 weight percent lithium iron phosphate), carbon nanotubes, and PVDF binder. The blend includes about 94% by weight hybrid cathode active material, of about 2.5% by weight carbon nanotubes, and about 3.5% by weight PVDF. The electrolyte, separator, and anode-to-cathode ratio of the cell is adjusted according to Table 3. The components of the cell are inserted in a housing that is a coin cell with an outer diameter of approximately 20 mm and an overall height of approximately 3.2 mm. These dimensions correspond to the 2032 designation and are similar to the 2032 designations from the International Electrotechnical Commission (IEC), e.g., CR2032 and PR2032. These dimensions represent what is commonly referred to as the 2032 coin cell.

Impedance testing follows what may be referred to as the 1 kHz Impedance Test. The 1 kHz Impedance Test is accomplished by connecting a battery to an auto-balancing, bridge-type impedance measurement instrument, such as 4333B milliohmmeter from Agilent. The battery is directly connected to the meter in a four-terminal configuration. The meter automatically measures real (resistance) and imaginary (reactance) components of the impedance vector. The real component (resistance) of the impedance vector are displayed and recorded by the meter. The resistance of the battery is reported in ohms ($\Omega$).

Performance testing includes discharge performance testing that may be referred to as the 1C Capacity Test. The 1C Capacity Test protocol consists of applying a constant charge current followed by a constant discharge current to the cell to specified cutoff voltages. The cell is first charged at a C/10 rate until a specified cutoff charge voltage of 4.2 V is reached. The cell then rests for a period of 60 minutes prior to being discharged. The cell is discharged at a 1C rate until reaching a cutoff discharge voltage of 2.0 V. The capacity that is measured during the 1C discharge is the 1C capacity of the cell.

Performance testing also includes discharge performance testing that may be referred to as the 10C Capacity Test. The 10C Capacity Test protocol consists of applying a constant charge current followed by a constant discharge current to the cell to specified cutoff voltages. The cell is first charged at a C/10 rate until a specified cutoff charge voltage of 4.2 V is reached. The cell then rests for a period of 60 minutes prior to being discharged. The cell is discharged at a 10C rate until reaching a cutoff discharge voltage of 2.0 V. The capacity that is measured during the 10C discharge is the 10C capacity of the cell.

Impedance and Performance Testing

A size 2032 cell is assembled that includes the combination of Separator 1 and Electrolyte B with an ASR of 1.66 $\Omega \cdot cm^2$ and an interfacial A/C ratio of 1.16. Impedance and performance tests are completed on the battery at room temperature, e.g., at about 21° C.

The cell exhibits an average 1 kHz impedance of about 2.166$\Omega$, an average 1C capacity of about 1.86 mAh, and an average 10C capacity of about 1.65 mAh. The cell also exhibits 10C capacity retention of about 88.7%. The cell exhibits an impedance reduction of about 5% along with 1C and 10C capacity improvements of about 15% and about 35% respectively versus a comparative cell that includes a separator/electrolyte combination that has an ASR of about 2.09 $\Omega \cdot cm^2$ and an interfacial A/C ratio of 1.16 having 10C capacity retention of about 75.9%.

TABLE 3

Performance Test results, at room temperature, for selected separator/electrolyte and Total A/C ratio combinations.

| Separator | Electrolyte | Total A/C Ratio | 1 kHz Impedance ($\Omega$) | 1C Capacity (mAh) | 10C Capacity (mAh) | 10C Capacity Retention (%) |
|---|---|---|---|---|---|---|
| 1 | B | 1.16 | 2.166 | 1.86 | 1.65 | 88.7 |
| 2 | B | 1.16 | 2.234 | 1.61 | 1.22 | 75.9 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A secondary electrochemical cell comprising an anode; a cathode comprising electrochemically active cathode material, said electrochemically active cathode material comprises one or more electrochemically active cathode materials chosen from the group of lithium-transition-metal phosphate, sodium-transition-metal phosphate, and lithium-metal oxide; a separator comprising one or more separator materials chosen from the group of polypropylene, polyethylene, polyvinylidene, and poly(vinylidene fluoride) disposed between said anode and said cathode; and an electrolyte, said electrolyte comprising at least one salt dissolved in at least one organic solvent, wherein said separator in combination with said electrolyte has an area-specific resistance of less than about 2 ohm-cm$^2$ and wherein said lithium-metal oxide comprises one or more lithium-metal oxides chosen from the group of LiCoO$_2$, LiNi$_x$Mn$_2$O$_4$, Li(Ni$_x$Co$_y$Al$_z$)O$_2$, Li(Ni$_x$Mn$_y$Co$_z$)O$_2$, and aLi$_2$MnO$_3 \cdot$(1-a)Li(Ni$_x$Mn$_y$Co$_z$)O$_2$, wherein 0<a<1, 0≤x≤1, 0≤y≤1, and 0≤z≤1.

2. The electrochemical cell of claim 1 wherein the lithium-transition-metal phosphate comprises LiMPO$_4$ wherein M comprises one or more metals chosen from the group of vanadium, chromium, manganese, iron, cobalt, tin, niobium, molybdenum, zirconium, zinc, and nickel.

3. The electrochemical cell of claim 1 wherein the sodium-transition-metal phosphate comprises NaMPO$_4$ wherein M comprises one or more metals chosen from the group of vanadium, chromium, manganese, iron, cobalt, tin, niobium, molybdenum, zirconium, zinc, and nickel.

4. The electrochemical cell of claim 1 wherein the separator porosity is between about 30% and about 70%.

5. The electrochemical cell of claim 1 wherein the at least one salt comprises one or more salts chosen from the group of lithium perchlorate (LiCl$_4$), lithium hexafluorophosphate (LiPF$_6$), lithium tetrafluorooxalatophosphate (LiPF$_4$(C$_2$O$_4$)), lithium tetrafluoroborate (LiBF$_4$), lithium trifluorosulfonate (LiSO$_3$CF$_3$), lithium trifluorosulfonimide (LiN(SO$_2$CF$_3$)$_2$), lithium bis(pentafluoroethanesulfonyl)imide (LiN(SO$_2$CF$_2$CF$_3$)$_2$) (LiBETi), lithium bis(oxalato)borate (LiBOB), lithium hexafluoroarsenate (LiAsF$_6$), lithium fluorosulfonimide (LiFSI), sodium perchlorate (NaClO$_4$), sodium trifluorosulfonimide (NaTFSI), and sodium trifluorosulfonate (NaTFS).

6. The electrochemical cell of claim 1 wherein the at least one salt is at a concentration within the electrolyte from about 0.5 M to about 1.8 M.

7. The electrochemical cell of claim 1 wherein the electrolyte comprises one or more electrolyte additives chosen from the group of propane sultone (PS), vinylene carbonate (VC), succinonitrile (SN), cyclohexylbenzene (CHB), tetra ethyl orthosilicate (TEOS), lithium bis(oxalato)borate (LiBOB), tetramethoxy titanium (TMTi), dimethyl acetamide (DMAc), lithium perchlorate (LiClO$_4$), and propargyl methane sulfonate (PMS).

8. The electrochemical cell of claim 1 wherein the electrolyte comprises at least one electrolyte additive at a concentration from about 0.05 to about 5 weight percent of the electrolyte solution.

9. The electrochemical cell of claim 1 wherein the organic solvent comprises one or more organic solvents chosen from the group of ethylene carbonate (EC), propylene carbonate (PC), butylene carbonate (BC), dimethyl carbonate (DMC), ethyl methyl dicarbonate (EMC), diethyl carbonate (DEC), dipropyl carbonate, methyl propyl carbonate, ethyl propyl carbonate, dibutyl carbonate, butylmethyl carbonate, butylethyl carbonate, and butylpropyl carbonate.

10. The electrochemical cell of claim 1 wherein the organic solvent is at a concentration from about 0.5 weight percent to about 95 weight percent of the electrolyte solution.

11. The electrochemical cell of claim 1 wherein the anode comprises an electrochemically active anode material chosen from one or more in the group of graphite, spheroidal natural graphite, mesocarbon microbead, coke, mesophase carbon fibers, fullerene, graphene, carbon nanotube, single-walled carbon nanotube (SWCNT), multi-wall carbon nanotube (MWCNT), vapor-phase grown carbon fiber (VGCF), silicon, silicon alloy, tin, tin alloy, and lithium titanate.

12. The electrochemical cell of claim 1 wherein the anode comprises a conductive additive chosen from one or more in the group of graphite, carbon black, acetylene black, vapor-phase grown carbon fiber (VGCF), carbon nanotube, fullerenic carbon nanotube, vitreous carbon, carbon fiber, and graphene.

13. The electrochemical cell of claim 1 wherein the separator has a thickness from about 8 to about 30 micrometers.

14. The electrochemical cell of claim 1 wherein the area-specific resistance is from about 1.0 to about 1.9.

15. The electrochemical cell of claim 1 wherein the cathode comprises a conductor material chosen from one or more in the group of carbon black, graphite, fullerenes, graphenes, carbon nanotube, single-walled carbon nanotube (SWCNT), multi-wall carbon nanotube (MWCNT), and vapor-phase grown carbon fibers (VGCF).

16. The electrochemical cell of claim 1 wherein said electrochemical cell has a total anode-to-cathode (A/C) ratio of less than about 1.5.

17. The electrochemical cell of claim 16 wherein the total anode-to-cathode (A/C) ratio is from about 1.0 to about 1.35.

* * * * *